H. A. GRAEF, OF BROOKLYN, NEW YORK.

Letters Patent No. 83,279, dated October 20, 1868.

IMPROVED METHOD OF DESTROYING INSECTS IN TREES AND PLANTS.

The Schedule referred to in these Letters Patent and making part of the same.

*To all whom it may concern:*

Be it known that I, H. A. GRAEF, of Brooklyn, in the county of Kings, and State of New York, have invented a new and improved Method for Destroying Caterpillars, and particularly the measure-worm; and I do hereby declare that the following is a full, clear, and exact description thereof, which will enable others skilled in the art to understand the same.

The object of this invention is to devise a means for destroying and exterminating the caterpillars, and more particularly the measure-worm, (*Ennomos subsignaria*,) by which a great number of trees and other plants are injured.

The invention consists in the application of diluted chloride of lime, which, when applied to these insects, will instantly kill them, by merely coming in contact with their skins.

The chloride of lime is mixed, in the proportion of one to sixteen parts, with water, if the animals to be destroyed are yet young, but the older they get, the more chloride of lime has to be added to the water, so that but eight parts of water may be used, together with one part of the chloride of lime.

The ingredients are mixed, and a stream of the liquid produced is then thrown over the tree or other plant on which the insects are found.

The liquid is best applied by means of a pump, which may be operated by hand or other power, and which will force the water through a hose in the required direction.

The process may, however, be varied, and I do not claim it; but

I do claim, and desire to secure by Letters Patent—

The described process of exterminating caterpillars and measure-worms, consisting in forcing a stream of water, containing chloride of lime, against the tree in which the insects are found, as herein shown and described.

The above specification of my invention signed by me, this 1st day of July, 1868.

H. A. GRAEF.

Witnesses:
    FRANK BLOCKLEY,
    ALEX. F. ROBERTS.